July 22, 1969  A. N. SVENSSON ET AL  3,456,795

SIEVE ELEMENTS

Filed April 11, 1967  3 Sheets-Sheet 1

Inventors
Assar N. Svensson,
Bertil Brandt
by Sommers & Young
Attorneys

Inventors
Assar N. Svensson,
Bertil Brandt
by Sommers + Young
Attorneys

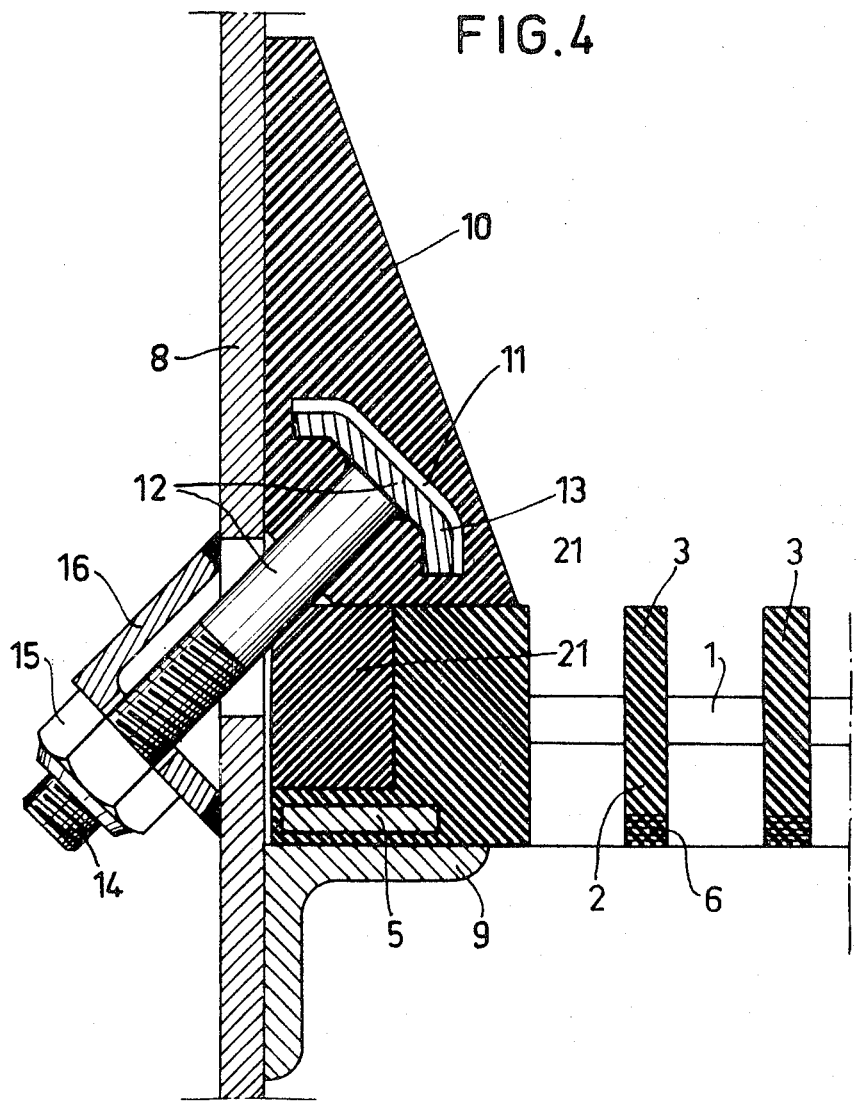

United States Patent Office 3,456,795
Patented July 22, 1969

3,456,795
SIEVE ELEMENTS
Assar Natanael Svensson, Ersmark, and Bertil Brandt, Skelleftea, Sweden, assignors to Skelleftea Gummifabriks A.-B., a Swedish joint-stock company
Filed Apr. 11, 1967, Ser. No. 629,967
Claims priority, application Sweden, Apr. 15, 1966, 5,165/66
Int. Cl. B07b 1/00
U.S. Cl. 209—399                                10 Claims

ABSTRACT OF THE DISCLOSURE

A sieve element comprising a sieve cloth of wear-resisting rubber provided with rows of openings. Elastic reinforcements are arranged between the rows of openings, preferably on the under side of the sieve cloth or in ribs arranged on the under side of the sieve cloth. The elastic reinforcements are secured to a rigid frame along the edges of the sieve cloth.

---

This invention relates to a sieve element comprising a sieve cloth of elastomeric material, preferably wear-resisting rubber, the sieve cloth being provided with arrays of openings. The sieve element is meant to be tensioned in a vibrating sieve.

Sieve cloths of rubber are known to have been used before. They have consisted of perforated freely oscillating rubber cloths. The cloth is supported by flat bars placed edgewise the upper side of which is provided with a rubber coating.

These known sieve cloths have been tensioned in a vibrated sieve. This has been achieved by bolting the sieve cloth to a suitable frame, clamping it between angle bars and flat bars.

These sieve cloths have however had a number of disadvantages of which the following ought to be mentioned.

As regards thinner sieve cloth it has appeared that the capacity has been reduced owing to the circumstance that the sieve cloth has "fluttered" on the flat bars placed edgewise, the result being that the sieve cloth has not been able to follow the vibrations of the sieve.

The sieve cloth often gets worn out both on the under side at the flat bars placed edgewise and on the upper side in the area above these flat bars. When solids of large particle size are sieved the rubber cloth is crushed where it is supported by the flat iron, with the result that one has to oversize the thickness; this has considerably reduced the sieving effect.

The flat bars placed edgewise cover a number of the sieve openings and thus reduce the effective sieve area. The openings close to the underlying flat bars are plugged by particles owing to the too tight base. 30–50 percent of the opening area is considered as the normal plugging on these sieve cloths.

The sieve cloth cannot normally be attached with sufficient tension, which is required for effective sieving.

The object of the present invention is to eliminate the above-mentioned disadvantages or to reduce them to a minimum, and it is mainly characterized in that elastic reinforcements are firmly attached between the arrays of openings and that these reinforcements are secured to a rigid frame along the edges of the sieve cloth.

Thanks to these elastic reinforcements practically every deformation of the sieve cloth is avoided during the motion (vibration) of the sieve to and fro, except for the deformation which is forcibly transferred from the vibrations. In this way the "fluttering" of the sieve is prevented. Where there are stringent stability requirements the sieve cloth between the arrays of openings can suitably be provided with ribs in which the elastic reinforcements are inserted and prestressed and secured to the rigid frames along the edges of the sieve cloth.

Thanks to the elastic reinforcement one needs no supports which wear the sieve cloth and interfere with the flow of the solids through the openings with the subsequent plugging of the openings.

It is advantageous to have the upper side of the sieve cloth provided with firmly attached ribs. The ribs should lie in a direction reaching from the feed end of the solids to the delivery end of the solids which do not pass through the sieve cloth. The above-mentioned damping of undesirable oscillations (fluttering) is intensified by the ribs on the upper side of the sieve cloth. These ribs contribute besides to a high degree to keep the openings in the sieve cloth free so that large-size particles do not plug the openings. The solids of large size will thus float above the ribs and the sieve openings will be freely available for solids of small size. The longitudinal mounting of the ribs (in the sieve direction) is a practical detail which contributes to the realization of these advantages. Thanks to the entirely free surface the ribs can be placed between each array of openings. It is impossible to arrive at this effective process on steel sieve cloths or on rubber sieve cloths supported on steel, since in the sieving process the solid particles immediately get caught between the ribs. In the above-mentioned sieves such ribs are usually placed so that there are at least two arrays of openings between each rib, but more usually three. The long distance between the ribs has the disadvantage that hardly any "double deck effect" is obtained, since the solid particles that are to be sieved find room between the ribs.

In order to make sure that the solids of small particle size find room between the ribs and thus do not block solids of large particle size when they pass along the ribs, these ribs ought to have a height which may reach the diameter of the sieve openings or, with oval or irregular openings, up to the maximum size of the sieve holes. The height of the rib should be less than three times its width, in order to avoid weak ribs.

The rigid frame consists preferably of a frame bolted to the edges of the sieve cloth by vulcanization. By bolting the rigid frame to the edges of the sieve cloth by vulcanization one obtains the advantage of firmly securing the elastic reinforcements, which, according to the present embodiment, are placed around the rigid frame and thus also bolted by vulcanization. According to the above embodiment the whole sieve cloth is thus confined by the rigid frame. In so doing one gains the advantage that no tension devices are required in order to give the sieve cloth enough tension, since, after the vulcanization process the rubber shrinks by between 1 and 2 percent.

The present invention is illustrated in the following, reference being made to the accompanying drawings, where:

FIGS. 4 and 5 show different methods of tensioning the sieve element to a sieve.

Figure 1:
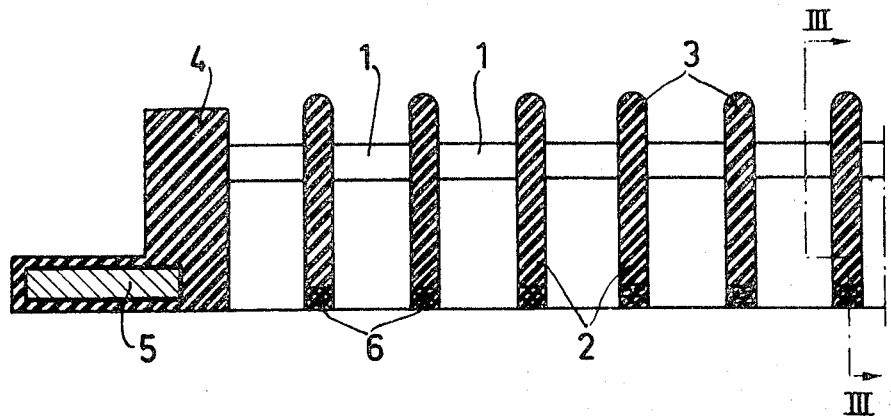
FIG. 1 shows a cross section of part of a sieve element according to the present invention.
Figure 2:
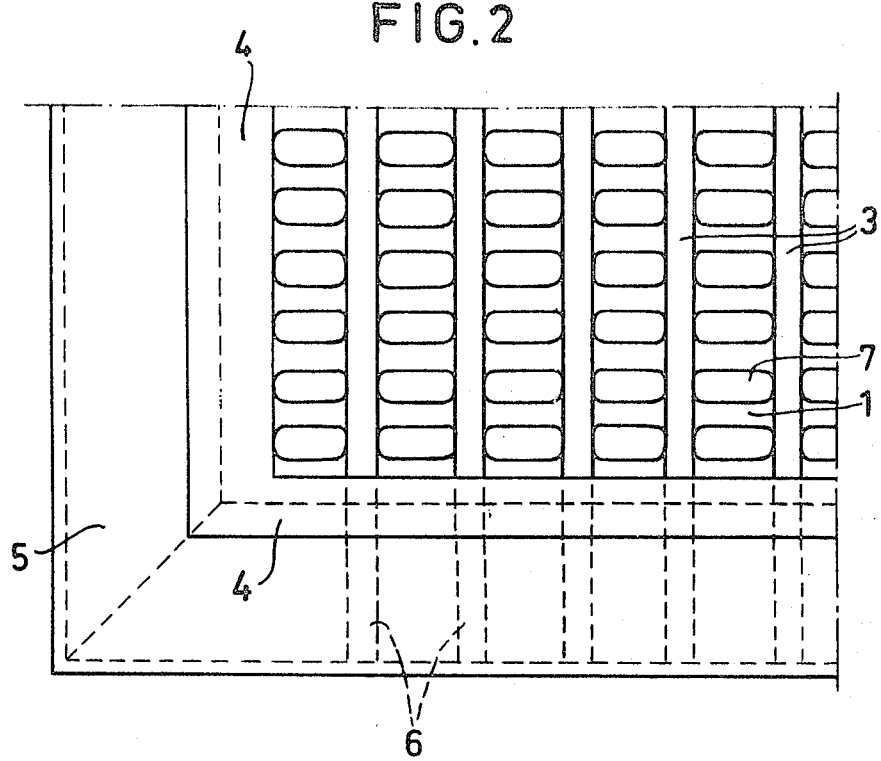
FIG. 2 shows a corner of the sieve element according to the present invention seen from above.
Figure 3:
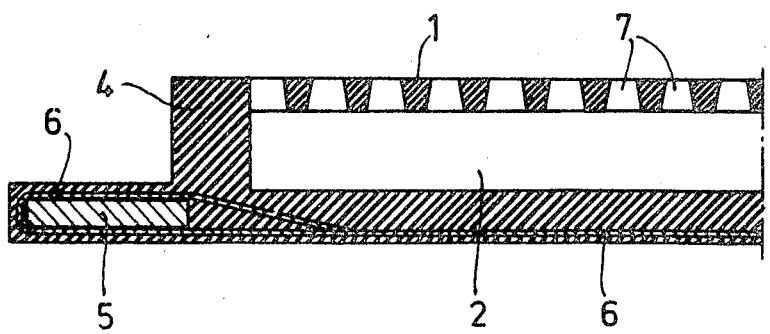
FIG. 3 shows a longitudinal section along the line III—III of FIG. 1.

According to FIGS. 1–3 the sieve element comprises a plane member 1 with sieve openings 7, which is provided with ribs 2 on the under side and ribs 3 on the upper side. Along the edges there is an L-shaped thicker rib 4. In one of the branches of the L-shaped rib a steel frame 5 is bolted by vulcanization. The plane member 1 and ribs 2, 3, and 4, are made in one piece of a wear-resisting rubber quality by means of mold-pressing. In the process of production an elastic reinforcement 6, say of cord, has been embedded in the longitudinal direction of the sieve element (i.e., in the sieve direction) secured to the two opposite sides of steel frame 5. These elastic reinforcements are to be found at the bottom of the ribs 2 on the under side of the finished mold-pressed sieve element. Thus the elastic reinforcements and the rigid frame are placed on the same level.

According to this preferred embodiment of the present invention the elastic reinforcements 6 are thus not attached in the plane member 1 of the sieve cloth, neither are they in contact with its under side, since such a cord reinforcement would lead to harder wear on the sieve cloth. Sieve elements with elastic reinforcements in or on the under side of the sieve cloth are included in the invention, but such sieve elements are exclusively intended for a sieving process which only occasions slight wear. By placing the elastic reinforcements in the lowest part of the ribs on the under side of the sieve cloth one gains the advantage that the sieve cloth grows many times more wear-resistant than it would be if the cord were placed in or directly under the plane member 1 of the sieve cloth.

Furthermore, a great advantage is gained in that the comparatively high ribs neutralize the "fluttering."

The distance between the elastic reinforcements and the plane member of the sieve cloth is not directly critical, and it is established partly in order to gain the above advantages and partly so that the ribs should not be too weak. Good results have been obtained with riddles when the height of the ribs has been equal to the thickness of the sieve cloth, and with finer sieves when the height of the rib has been equal to four times the thickness of the sieve cloth. The width of the ribs has in both cases been about equal to the thickness of the sieve cloth.

Within certain sieving ranges, for instance, when sievong solids of small particle size, there are greater demands as regards the flatness of the sieve cloth. This can be achieved by bending down the ribs and the elastic reinforcements in the process of mold-pressing the sieve elements. When the rubber shrinks after vulcanization the deflection is reduced, whereby the upper side of the sieve cloth gets an upturned convex bulging shape when not loaded. When solids are fed onto the sieve element the bulge is flattened out and the sieve cloth becomes plane. It has been proved that the prepressure obtained in this way constitutes to increase the efficiency of the sieve elements.

The ribs 3 on the upper side of the sieve element are placed straight above the ribs 2 and between the openings 7.

It is not necessary to produce the entire sieve element in one piece; parts of it, such as for instance, ribs 3, can be attached afterwards by vulcanization or glueing.

Figure 5:
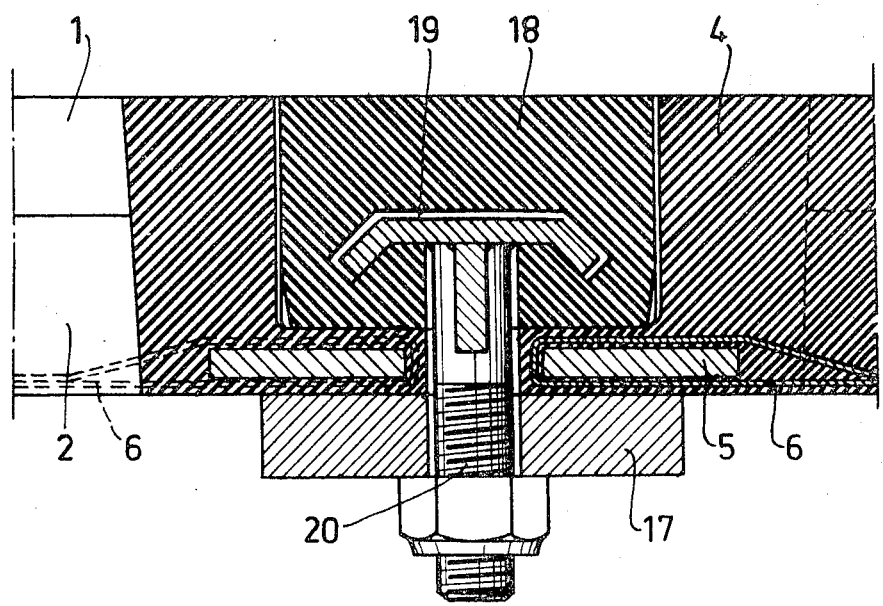

FIGS. 4 and 5 show two examples of how the sieve element can be tensioned into a sieve. As regards the sieve element references identical with those used in FIGS. 1 and 2 have been used here.

In FIG. 4 the sieve element has been tensioned into a sieve frame with vertical walls 8. An angle iron 9 figures as a support for the sieve element. A rubber rib 10 with an interior slot 11 is placed over the edge rib 4 of the sieve element, and it clamps the edge rib to the angle iron 9 by means of a clamping device 12, which comprises a rib 13 with a stud bolt 14 welded onto it, and a nut 15. For the filing of the L-shaped edge rib a rubber rib 21 of corresponding shape is used as filling material. In order to obtain a plane base for the nut an angle iron 16 has been welded onto wall 8.

FIG. 5 shows how two sieve elements have been jointed by means of joint tension against a steel rib 17. According to the shown embodiment the sieve elements are plane on their upper side, i.e., they have not been provided with any ribs 3. In an analogous manner a lock bar 18 of rubber with an interior slot 19 clamps the edge rib 4 of the sieve element by means of a clamping device 20.

A sieve provided with sieve elements according to the present invention has as regards the result of the sieving and its life been compared both with a conventional steel sieve and with a sieve with a rubber sieve cloth supported by steel ribs.

The material to be sieved consisted of iron ore from a coarse jaw crusher with a maximum particle size of 300 mm. Pieces of less than 70 mm. were to be sorted out.

The conventional steel sieve was worn out and had to be replaced when 70,000 tons of ore had been fed into it. The sieve with sieve elements according to the invention was not entirely worn out when 2,190,000 tons of ore had been fed into. As regards the sieve with a rubber sieve cloth (thickness 60 mm.) supported by steel ribs the rubber sieve cloth was crushed by the solids of large particle size after having been operated for a short time. The test conditions for this sieve were therefore changed in such a way that the solids of the largest particle size between 300 and 100 mm. were first sorted out so that only solids with a maximum particle size of 100 mm. were fed into the sieve. The life of the sieve cloth was then 130,000 tons of solids sieved.

All the sieves were of equal length. When using sieve elements according to the invention the solids were fully sieved, i.e., the solids of large particle size no longer contained any pieces of less than 70 mm. after half the sieve path had been passed. When using the other two sieves the solids were not fully sieved, i.e., the solids of large size still contained a small amount of solids of small particle size when the solids were removed from the sieve. This means that sieves with sieve elements according to the present invention can be made smaller than up to now, i.e., so that they require less space, or that a larger amount of solids can be sieved if the dimensions of the sieve elements are maintained.

What we claim is:

1. A sieve structure; comprising, a sheet of elastomeric material having arrays of openings formed therethrough; rib elements extending across said sheet in one direction and integrally formed with said sheet between said openings to provide rib portions of greater thickness than the thickness of said sheet; elastic reinforcing elements passing through said ribs; and rigid frame means secured to the outside edges of said sheet and having said reinforcing elements secured thereto.

2. A sieve structure in accordance with claim 1 wherein the ribs extend below the underside of the sheet.

3. A sieve structure in accordance with claim 1 wherein the ribs extend above the upper surface of the sheet.

4. A sieve structure in accordance with claim 1 wherein the sheet and the ribs are molded and the reinforcing elements have been prestressed prior to the molding of the sheet and the ribs.

5. A sieve structure in accordance with claim 1 wherein the outside edges of the sheet are vulcanized to the rigid frame means.

6. A sieve structure; comprising, a sheet of elastomeric material having arrays of openings formed therethrough; rib elements extending across said sheet in one direction, integrally formed with said sheet between said openings and extending both above and below the upper and lower surfaces of said sheet; elastic reinforcing elements passing through said ribs; and rigid frame means secured to the outside edges of said sheet and having said reinforcing elements secured thereto.

7. A sieve structure in accordance with claim 6 wherein the sheet and the rib elements are molded and the reinforcing elements have been prestressed prior to the molding of the sheet and the rib elements.

8. A sieve structure in accordance with claim 6 wherein the ribs extend above the upper surface of the sheet by a distance less than the maximum width of the openings through said sheet and the total height of the ribs to the width of the ribs is not greater than 3 to 1.

9. A sieve sructure in accordance with claim 6 wherein the rib elements are oriented in a direction parallel to the flow of material being filtered across said sieve structure.

10. A sieve structure in accordance with claim 6 wherein the edges of the sheet are vulcanized to the rigid frame means.

References Cited

UNITED STATES PATENTS

| | | | |
|---|---|---|---|
| 643,521 | 2/1900 | McCarroll | 209—399 X |
| 971,701 | 10/1910 | Stone | 209—400 |
| 1,718,385 | 6/1929 | Sherwood | 209—397 |
| 3,121,660 | 2/1964 | Hall | 209—397 X |
| 3,194,397 | 7/1965 | Taege | 209—398 X |

FOREIGN PATENTS

| | | |
|---|---|---|
| 698,151 | 11/1940 | Germany. |
| 108,053 | 7/1937 | Australia. |

OTHER REFERENCES

Taege et al., German printed application No. 1,197,310, July 1965.

TIM R. MILES, Primary Examiner